(12) United States Patent
Matsumoto

(10) Patent No.: US 8,183,977 B2
(45) Date of Patent: May 22, 2012

(54) SYSTEM OF CONTROLLING DEVICE IN RESPONSE TO GESTURE

(75) Inventor: Shigeyuki Matsumoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 276 days.

(21) Appl. No.: 12/713,117

(22) Filed: Feb. 25, 2010

(65) Prior Publication Data

US 2010/0219934 A1    Sep. 2, 2010

(30) Foreign Application Priority Data

Feb. 27, 2009    (JP) ................................. 2009-046678

(51) Int. Cl.
| | |
|---|---|
| G05B 19/00 | (2006.01) |
| G05B 11/01 | (2006.01) |
| G08B 19/00 | (2006.01) |
| G08B 1/08 | (2006.01) |
| G09G 5/00 | (2006.01) |
| G06F 3/042 | (2006.01) |
| H04N 5/64 | (2006.01) |
| G06F 3/033 | (2006.01) |

(52) U.S. Cl. . 340/5.1; 340/12.22; 340/522; 340/539.22; 345/156; 345/175; 345/173; 348/789; 348/744; 715/863

(58) Field of Classification Search ......................... None
See application file for complete search history.

(56) References Cited

U.S. PATENT DOCUMENTS

| | | | |
|---|---|---|---|
| 5,732,227 A | 3/1998 | Kuzunuki et al. | |
| 6,175,954 B1 | 1/2001 | Nelson et al. | |
| 2006/0125799 A1* | 6/2006 | Hillis et al. | 345/173 |
| 2008/0150913 A1* | 6/2008 | Bell et al. | 345/175 |
| 2009/0115721 A1* | 5/2009 | Aull et al. | 345/156 |
| 2009/0190046 A1* | 7/2009 | Kreiner et al. | 348/789 |

FOREIGN PATENT DOCUMENTS

| | | |
|---|---|---|
| JP | 07-175587 A | 7/1995 |
| JP | 10-031551 A | 2/1998 |
| JP | 377830 B2 | 5/2006 |

\* cited by examiner

*Primary Examiner* — Daniel Wu
*Assistant Examiner* — Fekadeselassie Girma
(74) *Attorney, Agent, or Firm* — Kilpatrick Townsend & Stockton

(57) ABSTRACT

A control system includes: an input unit through which a signal for a gesture and a background of the gesture is input; a gesture recognition unit which recognizes the gesture on the basis of the input signal; an attribute recognition unit which recognizes an attribute of a background target of the recognized gesture on the basis of the input signal; and a command transmitting unit which generates a control command on the basis of a combination of the recognized gesture and the background target attribute and transmits the control command to a device.

7 Claims, 6 Drawing Sheets

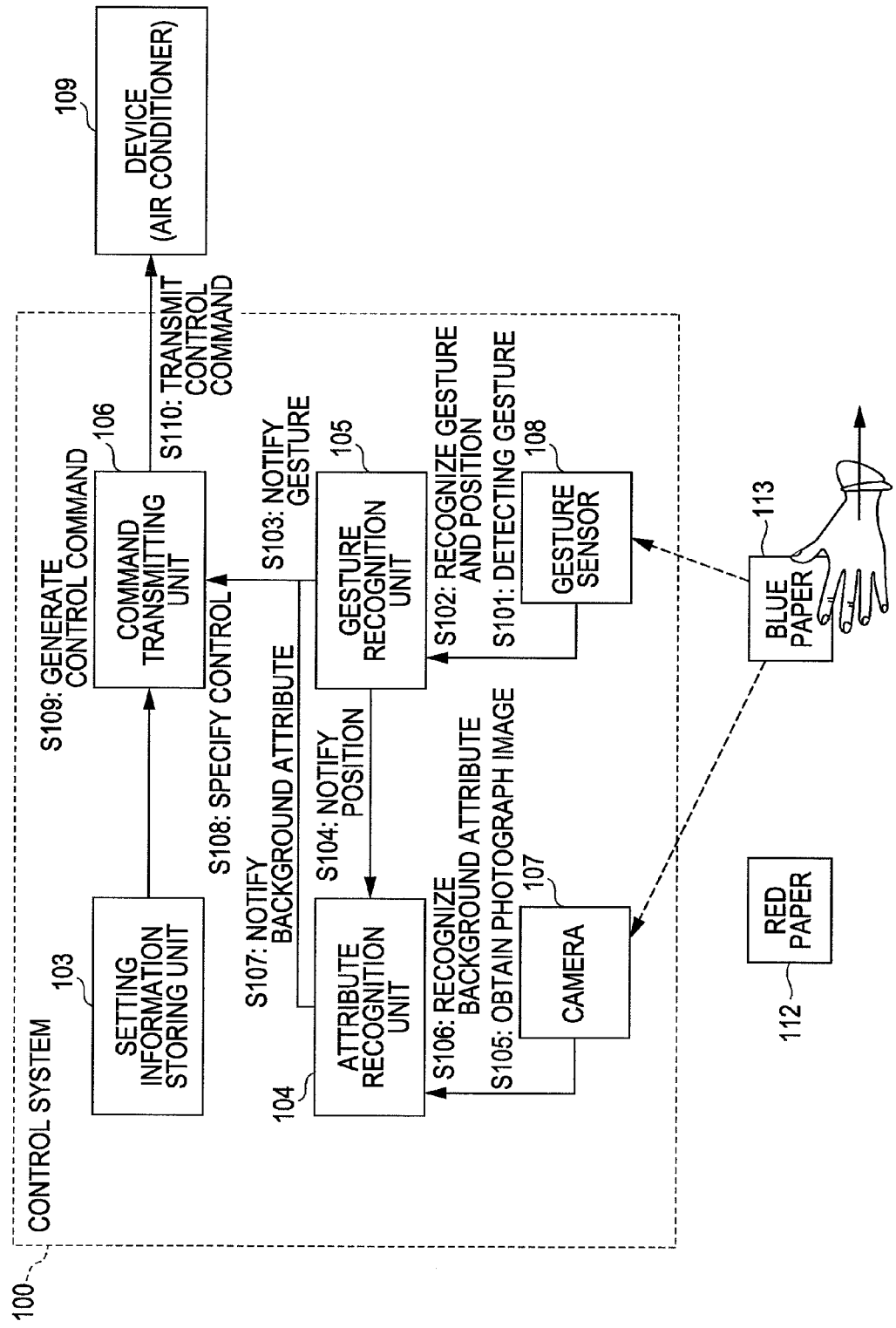

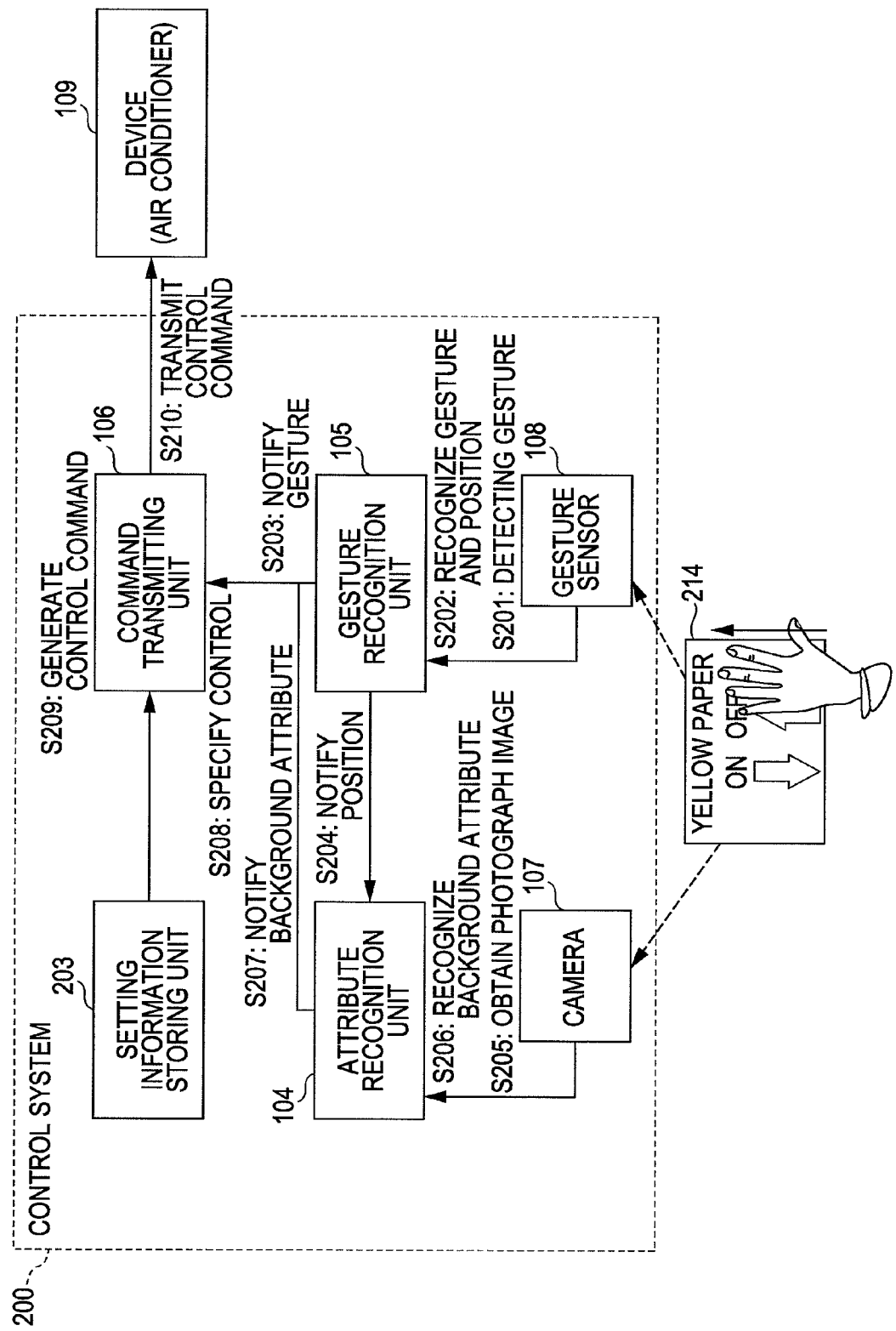

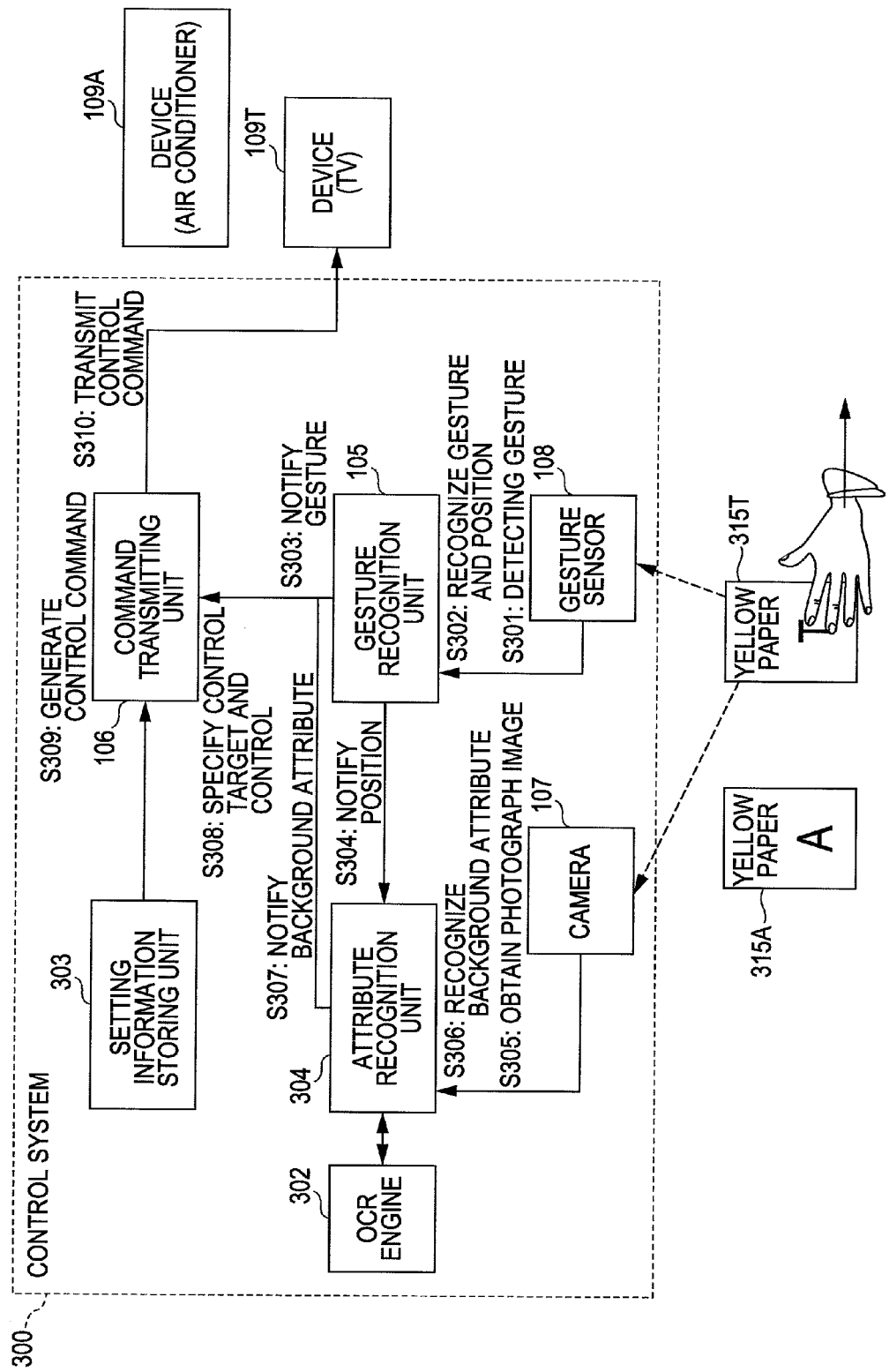

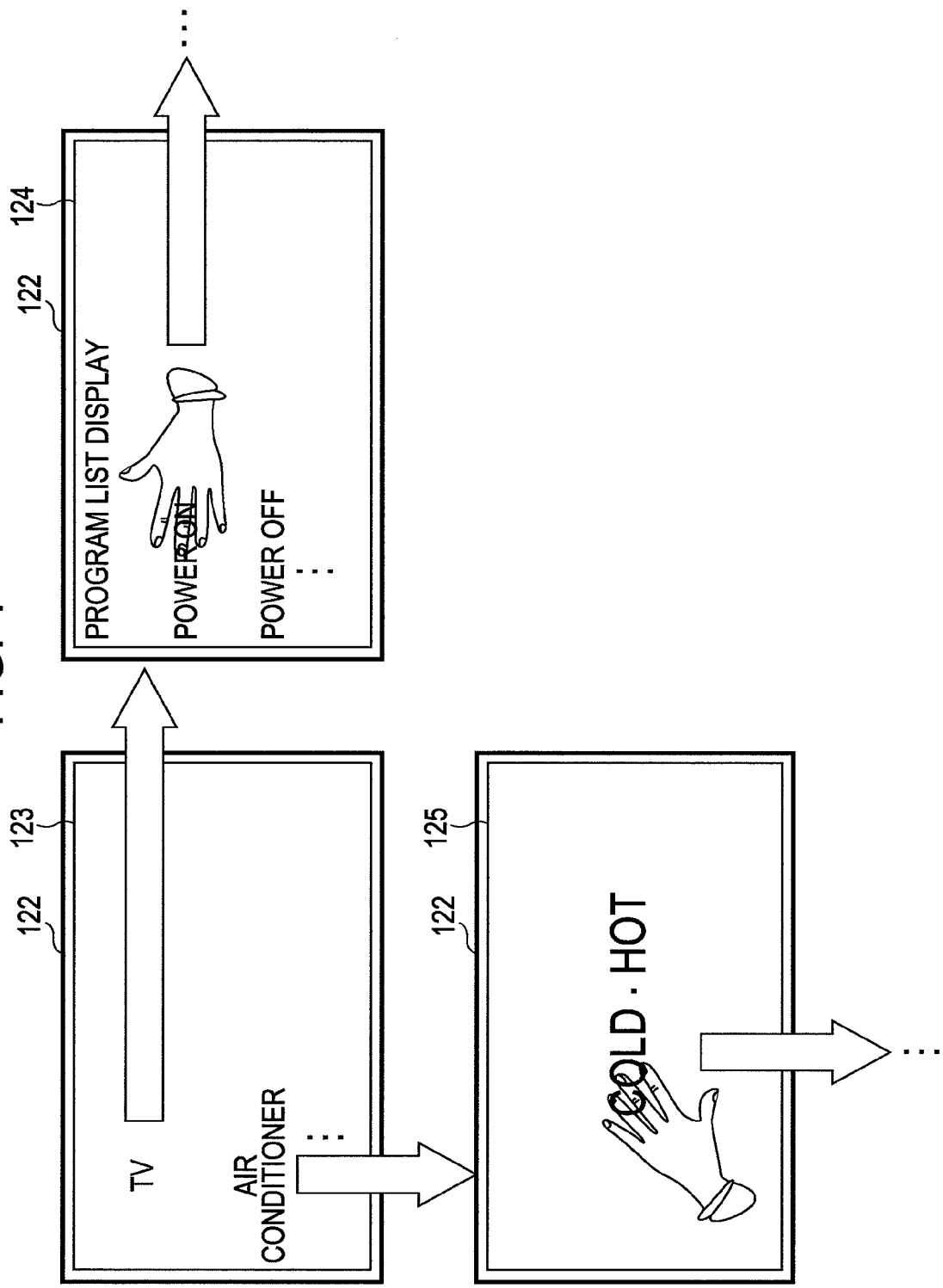

MOVE CLOSE TO: ILLUMINATION ON    MOVE AWAY FROM: ILLUMINATION OFF

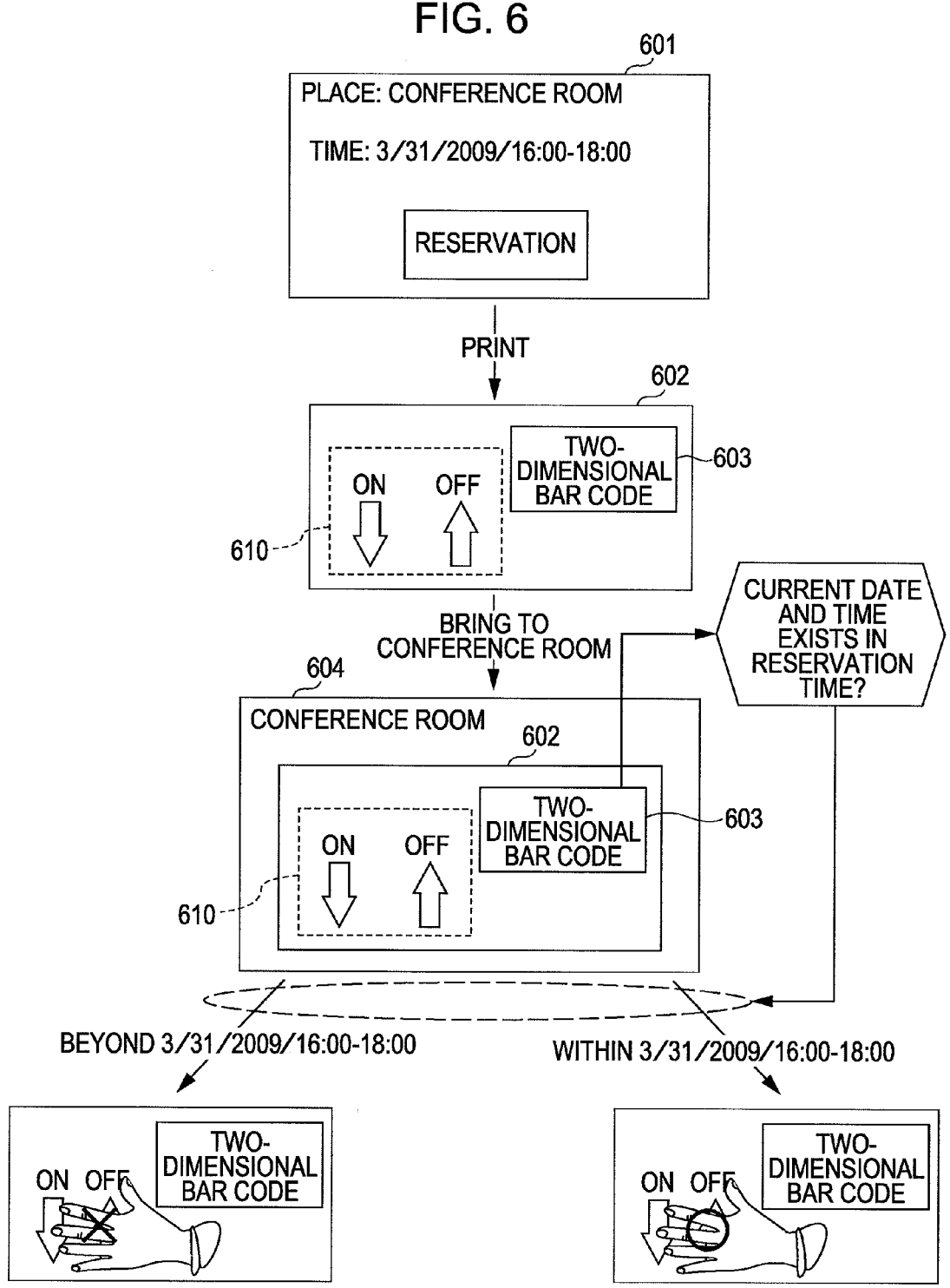

SYSTEM OF CONTROLLING DEVICE IN RESPONSE TO GESTURE

BACKGROUND

1. Technical Field

The present invention relates to a system of controlling a device in response to a gesture.

2. Related Art

In order for a human being to control a device in a naturally intuitive manner, there are proposed several technologies which control a device using a gesture. However, in the case that different controls are to be performed using the same gesture (for example, in the case that different controls are to be performed for the same device or in the case that a plurality of different devices is to be controlled), there exist the following problems.

In any case, a gesture may be required for every function. However, it is difficult to analogize a corresponding gesture to a certain function (for example, a "power on" function). It is not easy for a human being to remember and correctly control all the gestures each corresponding to all the functions. In another case, a control or a device should be selected. In this case, a certain method for proposing a candidate of the control or the device is required in advance, and a gesture for selection is performed on this basis, and thus, a gesture which should be naturally intuitive becomes laborious and inefficient.

The problems may be partly solved by providing different meanings for a specific gesture using several methods.

As one of the methods, there is a method which uses a voice together with a gesture, for example, as disclosed in JP-A-10-31551. That is, the method uses the voice at a point of time when the gesture is recognized, or language information according to the voice or voice recognition.

However, with voices, a problem of false recognition due to noises or individual differences is significant, and further, a user needs to remember a corresponding relation between controls or devices and plural types of words, and thus, it is not possible to substantially prevent a human being from being inconvenienced.

SUMMARY

An advantage of some aspects of the invention is that it provides a control system enhancing convenience of a technology that enables a different control using the same gesture.

A system of controlling a device includes: a gesture recognition unit which recognizes a gesture; an attribute recognition unit which recognizes an attribute of a background target of the recognized gesture; and a command transmitting unit which generates a control command on the basis of a combination of the recognized gesture and the background target attribute and transmits the control command to a device.

The gesture is not limited to motion of a human body, but may be performed with anything (for example, an indicating stick).

Herein, the background target is, for example, at least one of a shape, letter (for example, including numeral or symbol), color and pattern. The background target may be specified on the basis of a photograph image of a background of the gesture, or may be expressed as information read from a storage medium (for example, RFID (radio frequency identification) tag) installed in a variety of targets.

BRIEF DESCRIPTION OF THE DRAWINGS

The invention will be described with reference to the accompanying drawings, wherein like numbers reference like elements.

FIG. 1 illustrates functional blocks and process flows of a control system according to a first embodiment of the invention.

FIG. 2 illustrates functional blocks and process flows of the control system according to a second embodiment of the invention.

FIG. 3 illustrates functional blocks and process flows of the control system according to a third embodiment of the invention.

FIG. 4 illustrates a process performed according to a fourth embodiment of the invention.

FIG. 6 illustrates a process performed according to a sixth embodiment of the invention.

DESCRIPTION OF EXEMPLARY EMBODIMENTS

Figure 5A:
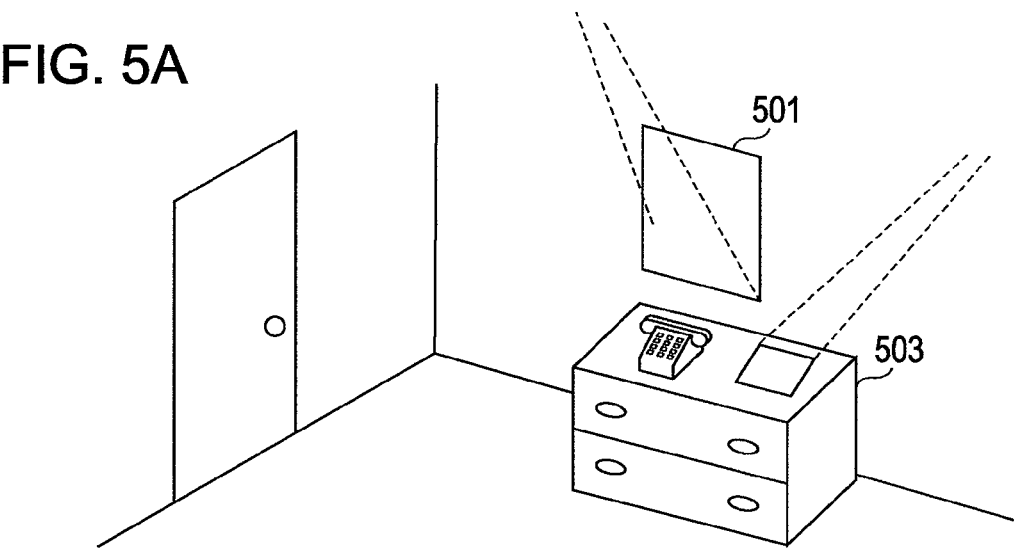
FIG. 5A illustrates a process performed according to a fifth embodiment of the invention.

Hereinafter, embodiments of the present invention will be described with reference to the accompanying drawings.

First Embodiment

FIG. 1 illustrates functional blocks and process flows of a control system 100 according to a first embodiment of the invention.

There is provided a device 109 as a control target. The device 109 may employ a variety of apparatuses, for example, a personal computer, a television apparatus, a printer, a projector, an electronic paper, an illumination device, or an air conditioner. In the present embodiment, the control target device 109 is provided as, for example, a single device, but the control target device 109 may be provided as a plurality of devices, as in a third embodiment to be described later.

The control system 100 recognizes color as a background target of a gesture and transmits a control command corresponding to a combination of the gesture and an attribute of the recognized color to the device 109. For this reason, a user controls the device 109 by performing a gesture over a target having a certain color. That is, a gesture to be performed over a target having a certain color is selected, according to how it is desired to control the device 109. The background target of the gesture may include, for example, things such as a wall, paper, a device, a human body or some part thereof (such as a head, hand or leg), an image projected by a projector or the like, or a display image on a display screen of a mobile phone, a personal computer, an electronic paper or the like.

The control system 100 includes a gesture sensor 108, a camera 107, a gesture recognition unit 105, an attribute recognition unit 104, a setting information storing unit 103, and a command transmitting unit 106. The gesture recognition unit 105, the attribute recognition unit 104 and the command transmitting unit 106 may be provided as a hardware circuit, a function realized by executing a computer program by a microprocessor, or a combination of the hardware circuit and the function. Further, the gesture recognition unit 105, the attribute recognition unit 104, the setting information storing unit 103 and the command transmitting unit 106 may be provided in a single apparatus (for example, the hardware circuit) or may be separately provided in a plurality of apparatuses.

The gesture sensor 108 detects a gesture. The gesture sensor 108 may include, for example, a camera, a laser pointer or the like. A signal indicating the detected gesture is input to the gesture recognition unit 105 from the gesture sensor 108.

The camera 107 is installed, for example, in a predetermined place (for example, a ceiling of a room) to photograph a background of the gesture. A signal indicating an image photographed by the camera 107 is input to the attribute recognition unit 104 from the camera 107. In this respect, the photograph image may be a moving image or a still image. The camera 107 may be provided in a plurality. A special camera which detects only light having a specific wavelength may be employed as the camera 107. In this case, a color material emitting the light having the specific wavelength is put on a surface of the target having the background target attribute of the gesture.

The gesture recognition unit 105 recognizes the gesture on the basis of the signal input from the gesture sensor 108. The gesture recognition unit 105 notifies the command transmitting unit 106 of information indicating the recognized gesture. In addition, the gesture recognition unit 105 also recognizes a position (hereinafter, referred to as a gesture position) in which the gesture is performed. The gesture position is recognized, for example, on the basis of information indicating that the signal is input from a certain gesture sensor 108 among the plurality of gesture sensors 108 (that is, on the basis of information indicating that the certain gesture sensor 108 detects the gesture). The gesture recognition unit 105 notifies the attribute recognition unit 104 of information indicating the recognized gesture position. The gesture position may be expressed in a coordinate system, for example, in response to an installation position, etc. of the camera 107. For example, in the case that the camera 107 is installed on a ceiling of a room, the gesture position may be expressed in an xyz coordinate system in which a longitudinal axis and a transverse axis of the room are the x-axis and y-axis, respectively, and a height thereof is z-axis. In this case, an attribute of the background target of the gesture exists in a position lower than a z coordinate of the gesture position.

The attribute recognition unit 104 analyzes the photograph image input from the camera 107 on the basis of the gesture position indicated by information which is notified from the gesture recognition unit 105, so as to recognize the attribute of the background target of the gesture. The attribute recognition unit 104 notifies the command transmitting unit 106 of information indicating the recognized background target attribute.

The setting information storing unit 103 is a storing resource (for example, volatile or nonvolatile memory). The setting information storing unit 103 stores setting information in advance. The setting information is information indicating that a certain control is to be performed in the case that a certain gesture and a certain background target attribute are recognized. The setting information may be edited by a user from a specific console.

The command transmitting unit 106 specifies, from the setting information in the setting information storing unit 103, a control and a control target corresponding to a combination of the gesture indicated by information notified from the gesture recognition unit 105 and the background target attribute indicated by information notified from the attribute recognition unit 104. The command transmitting unit 106 generates a control command for performing the control specified for the specified control target (device 109) and transmits the generated control command to the device 109.

Hereinafter, a process flow performed in the present embodiment will be described. In this respect, it is assumed that the device 109 is an air conditioner and the setting information includes information indicating that a control target is an air conditioner; a red color or a blue color represents a power switch; a red color represents "ON"; and a blue color represents "OFF". Further, it is assumed that an attribute of color which is a background target of a gesture is two colors of red and blue, and things having the background target are a red paper 112 and a blue paper 113 (the red paper 112 and the blue paper 113 may be paper on which a red color region and a blue color region are printed using a color material emitting light having a special wavelength or may be commercially available paper). In addition, it is assumed that gestures which are performed over the red paper 112 and the blue paper 113 are the same (for example, a gesture that a hand is horizontally moved from the left to the right as indicated by an arrow).

For example, in the case that a user performs a gesture in proximity to and over the blue paper 113, the gesture sensor 108 detects the gesture (S101). A signal indicating the detected gesture is input to the gesture recognition unit 105.

The gesture recognition unit 105 recognizes the gesture and a position of the gesture on the basis of the signal input from the gesture sensor 108 (S102). The gesture recognition unit 105 notifies the command transmitting unit 106 of information indicating the recognized gesture (S103), and notifies the attribute recognition unit 104 of information indicating the recognized gesture position (S104).

The attribute recognition unit 104 obtains a photograph image of the background of the gesture position indicated by the notified information, that is, a photograph image displayed in the blue paper 113, from the camera 107 (S105). For example, the attribute recognition unit 104 enables the camera 107 to photograph the background using a region of a predetermined size including the gesture position as a view. In this case, the photograph image of the background target of the gesture after the gesture is recognized is obtained. For this reason, in the photograph image, the possibility that the background target is hidden by a part moved by the gesture may be decreased. The attribute recognition unit 104 analyzes the photograph image to recognize the blue color as the background target attribute (S106), and notifies the command transmitting unit 106 of information indicating that the recognized background target attribute is the blue color (S107).

The command transmitting unit 106 specifies a control "power switch on" corresponding to a combination of the gesture indicated by the notified information and the background target attribute of the blue color, from the setting information in the setting information storing unit 103 (S108). The command transmitting unit 106 generates a control command for turning on the air conditioner 109 (S109) and transmits the generated control command to the air conditioner 109 (S110). Thus, the air conditioner 109 is turned on.

Hereinbefore, the first embodiment has been described. The red paper 112 and the blue paper 113 may be provided in a user desired place, for example, on a wall of a room, or may be displaced to any other room. In the case that the gesture is performed over the red paper 112 and the blue paper 113 in the other room, power on and off of an air conditioner installed in the room is controlled. That is, power switches (red paper 112 and blue paper 113) of air conditioners in a plurality of rooms may be provided as a common switch. Further, the control system 100 may be provided in every room, but it is preferable that the camera 107, the gesture sensor 108 and the device 109 are installed in every room and the gesture recognition unit 105, the attribute recognition unit 104, the setting information storing unit 103 and the command transmitting unit 106 are common for the plurality of rooms, from a point of view of reduction of the number of components, etc.

According to the above described first embodiment, the control is performed according to the combination of the gesture and the background target attribute. For this reason, it is possible to perform different controls with the same gesture. In addition, since it is possible to intuitively analogize that a certain control is to be performed from the background target attribute, the burden that a user has to memorize a corresponding relation between the combination of the gesture and the background target attribute and the performed control may be reduced.

Second Embodiment

Hereinafter, a second embodiment according to the invention will be described. Herein, different configurations of the first embodiment and the second embodiment will be mainly described, and like configurations of the first embodiment and the second embodiment will be omitted or simply described (this is the same as in the third to sixth embodiments).

FIG. 2 illustrates functional blocks and process flows of a control system 200 according to the second embodiment of the invention.

A sheet of yellow paper 214 is used as a power switch (a thing having a background target) of an air conditioner 109. A method of performing a gesture for each of power on and off of the air conditioner 109 is written on the yellow paper 214 (for example, as shown in FIG. 2, an arrow indicating a direction in which a hand is moved). According to the yellow paper 214, it is necessary to perform a down gesture in which the hand is moved from up to down over the yellow paper 214 so as to turn on power of the air conditioner 109, and it is necessary to perform an up gesture in which the hand is moved from down to up over the yellow paper 214 so as to turn off power.

Setting information in a setting information storing unit 203 includes information indicating that a control target is an air conditioner; a yellow paper represents a power switch; an up gesture represents "OFF" and a down gesture represents "ON".

For example, as shown in FIG. 2, it is assumed that the gesture (up gesture) in which the hand is moved from down to up in proximity to and over the yellow paper 214 is performed. In this case, steps S201 to S210 which are approximately the same as the above described steps S101 to S110 are performed, respectively. For example, in step S202, the up gesture is recognized; and in step S203, information indicating the up gesture is notified to a command transmitting unit 106. In addition, in step S206, a yellow color is recognized as an attribute of the background target; and in step S207, information indicating that the background target attribute is the yellow color is notified to the command transmitting unit 106. The command transmitting unit 106 specifies a control "OFF" corresponding to the up gesture and the background target attribute of the yellow color from the setting information (S208), generates a control command for turning off the air conditioner 109 (S209) and then transmits the control command to the air conditioner 109. Accordingly, the air conditioner 109 is turned off.

According to the second embodiment, a set of a downward arrow and a letter "ON", and a set of an upward arrow and a letter "OFF" are written on the yellow paper 214. For this reason, although different gestures are required for the power on and off, any human may control the air conditioner 109, and further, it is possible to reduce the paper as the power switch to a single sheet (in the first embodiment, a region of the red color and a region of the blue color may exist on a single sheet).

The second embodiment may be realized on the basis of the first embodiment as follows. That is, in the second embodiment, the setting information in the first embodiment is edited to the above described setting information and the yellow paper 214 is prepared instead of papers 112 and 113. A method of performing a gesture by means of an arrow or the like may include a user's hand writing.

Third Embodiment

FIG. 3 illustrates functional blocks and process flows of a control system 300 according to a third embodiment of the invention.

A plurality of devices includes, for example, an air conditioner 109A and a television apparatus (TV) 109T. Further, an OCR (optical character reader) engine 302 is provided in the control system 300. The OCR engine 302 recognizes a letter on a target displayed in a photograph image. The OCR engine 302 is, for example, a computer program and is executed in a microprocessor.

The present embodiment uses a letter as well as a color, as the background target. For example, setting information in a setting information storing unit 303 includes information indicating that a letter "A" represents an air conditioner; a letter "T" represents a TV; a transverse gesture represents an on and off toggle; an up gesture represents "move up"; a down gesture represents "move down", and a yellow color represents a switch. Thus, a first paper 315A and a second paper 315T are provided as things having the background target. The first paper 315A has the letter "A" and the yellow color on a surface thereof, and the second paper 315T has the letter "T" and the yellow color on a surface thereof.

For example, as shown in FIG. 3, it is assumed that a transverse gesture that a hand is moved in a horizontal direction is performed in proximity to and over the second paper 315T. In this case, steps S301 to S310 which are approximately the same as the above described steps S101 to S110 are performed, respectively. For example, in step S302, the transverse gesture is recognized; and in step S303, information indicating the transverse gesture is notified to a command transmitting unit 106. Further, in step S306, the yellow color is recognized as an attribute of the background target, and an attribute recognition unit 304 makes the OCR engine 302 analyze the photograph image, and thus, the letter "T" is also recognized as the background target attribute. In step S307, information indicating that the background target attribute represents the yellow color and the letter "T" is notified to the command transmitting unit 106. The command transmitting unit 106 specifies, from the setting information, a control target "TV" and a control "on and off toggle" corresponding to the transverse gesture and the background target attribute of the yellow color and the letter "T" (S308). The command transmitting unit 106 generates a control command for switching the power of the TV 109T on and off (S309) and transmits the control command to the TV 109T. Thus, the power on and off of the TV 109T is switched.

According to the third embodiment, it is possible to switch the power of the air conditioner 109A on and off and to perform up and down control of a setting temperature, or to switch power on and off of the TV 109T and to perform up and down control of volume, by means of only three types of gestures of the transverse gesture, the up gesture and the down gesture. That is, a letter is added as a type of the background target attribute in addition to color, more control targets may be controlled using the same gesture or many controls may be performed. Moreover, since it may be easily analogized the up and down gesture that a certain control is performed, such a gesture may be easily contrived.

The third embodiment may employ the following applications. For example, simply by moving a finger in a transverse direction over a desired telephone number among a list of telephone numbers, the telephone number is transmitted to the other party (in this case, a control target is a telephone in a room). Further, simply by moving a finger in a certain direction over numerals (dates) on a calendar installed on a wall in the room, information including a user's schedule or a TV program schedule, etc. is may be displayed on an output device such as a TV or PC (In this case, the control target is the output device).

In addition, according to the third embodiment or the above described first and second embodiments, as a target having certain setting information and a certain background target attribute is prepared, a variety of control methods is generated. That is, flexibility becomes high and the things to be stored decrease, and thus, user convenience is enhanced.

Fourth Embodiment

In a fourth embodiment of the invention, a command transmitting unit generates and transmits a command control for performing an output having a background target attribute of a gesture in an output device.

More specifically, for example, as shown in FIG. 4, the command transmitting unit enables a projector to project an initial menu 123 on a screen 122. This process may be performed in response to detection of the entrance of a user or may be performed in response to a specific gesture of the user. The projector is a kind of device which may be a control target according to the gesture.

The initial menu 123 is a list of letter rows indicating a device which may be the control target. Instead of the letter row, any other gesture background target such as a mark may be employed.

If a predetermined gesture is performed over the initial menu 123, the gesture and a background target attribute of the gesture are recognized. The command transmitting unit generates a control command for indicating a manipulation menu corresponding to the combination and transmits the control command to the projector. Thus, a transition is performed from the initial menu 123 to the manipulation menu. For example, if a predetermined gesture is performed over a letter row "TV" in the initial menu 123, a TV manipulation menu 124 is displayed. If a predetermined gesture is performed over a letter row "air conditioner" in the initial menu 123, an air conditioner manipulation menu 125 is displayed.

As described above, in the fourth embodiment, the command transmitting unit enables the projector to display a menu having the background target of the gesture. According to the fourth embodiment, even though devices or controls for the control target are increased, it is not necessary to increase things (for example, paper) having the background target.

In the above description, the same gesture is performed over the whole of the background targets in consideration of convenience, but instead, a user desired gesture may be performed. The combination of the gesture and the background target attribute is defined as setting information. Further, the output device through which the menu is output is not limited to the projector, but may employ a device such as a personal computer, a TV, or an electronic paper.

Fifth Embodiment

In a fifth embodiment of the invention, there is provided in a control system a background target notification unit which notifies a user of a gesture background target among things which exist in a place (for example, inside a room) in which the user is present. The background target notification unit may be realized by a combination of, for example, the above described command transmitting unit and an illumination device. In this case, the command transmitting unit illuminates light from the illumination device to the background target, to thereby notify the user of the background target. According to an example in FIG. 5A, since the light is illuminated on a letter row in a calendar 501 or color on a paper 503, as indicated by a dotted line, the user may recognize that the letter row in the calendar 501 or the color on the paper 503 is the background target.

The present embodiment will be more specifically described as follows. For example, the attribute recognition unit obtains a photograph image in a room from a camera, analyzes the photograph image and specifies the background target on the basis of the analyzed result and setting information. For example, the attribute recognition unit recognizes, in the case that only information indicating an attribute for color is included in the setting information, the color is recognized as the background target. However, even though a letter or any other target is specified from the photograph image, it is not recognized as the background target. The attribute recognition unit notifies the command transmitting unit of information indicating a position of the specified background target. The command transmitting unit controls the illumination device to illuminate light to a position indicated by information notified from the attribute recognition unit.

Figure 5B:
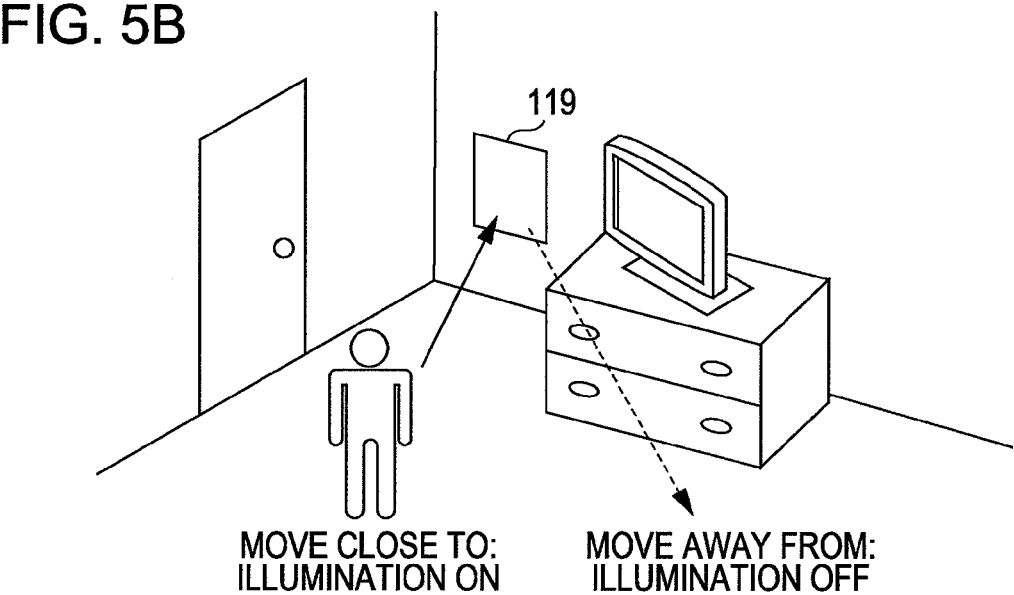
FIG. 5B illustrates a process performed as a modified example according to the fifth embodiment of the invention.

Hereinafter, a modified example will be described as follows. That is, the attribute recognition unit recognizes a position of a user from the photograph image and notifies the command transmitting unit of the position information of the user. The command transmitting unit controls the illumination device to illuminate light to the background target in the case that the user is present at a predetermined distance from the background target, and stops the light illumination of the illumination device in the case that the user moves to a place removed from the background target by a predetermined distance. In this case, for example, as shown in FIG. 5B, in the case that the user moves close to a paper 119 having the background target, the paper 119 is illuminated, and thus, the user recognizes that the background target exists in the paper 119. In addition, in the case that the user moves away from the background target, the illumination is stopped, thereby saving power.

Hereinbefore, the fifth embodiment of the invention and one modified example thereof have been described. In this respect, the notification method of the background target is not limited to the light illumination, but various methods such as notification using a voice may be employed.

Sixth Embodiment

In a sixth embodiment of the invention, an effective period of a background target is set. If a gesture is performed over the background target in a period other than the effective period, a control corresponding to a combination of an attribute of the background target and the gesture is not performed. Hereinafter, a specific example thereof will be described.

Specifically, for example, as shown in FIG. 6, in the case that reservation of a usage time of a conference room (or a device in the conference room) is performed, a system 601 which receives the reservation (hereinafter, for example, a microprocessor which executes a computer program) prints a region 610 having a background target (for example, color) and a two-dimensional bar code 603 through a printer. Accordingly, the user may obtain a printout 602 which includes the region 610 having the background target and the two-dimensional bar code 603. The two-dimensional bar code 603 has information indicating the reserved usage time.

The user brings the printout 602 to the conference room 604. The user puts the printout 602 on a desired or specific place (for example, on a table) in the conference room. The user performs a gesture for performing a desired control on a region 610 in the printout 602.

An attribute recognition unit analyzes a photograph image of the printout 602 which exists to the rear of the gesture. Accordingly, the attribute recognition unit specifies information indicated by the two-dimensional bar code 603 in the printout 602, and notifies a command transmitting unit of the information specified from the two-dimensional bar code 603 other than information indicating the background target attribute.

The command transmitting unit specifies the usage time indicated by information specified from the two-dimensional bar code 603, and determines whether the current date and time exists in the usage time. If the current date and time exists in the usage time, the command transmitting unit transmits a control command corresponding to the combination of the gesture and the background target attribute to the control target (that is, device in the conference room). Meanwhile, if the current date and time is not in the usage time, the command transmitting unit does not transmit the control command to the control target.

As described above, it is not possible to control the device in the conference room in a time range other than the reserved usage time. The sixth embodiment is not limited to the reservation of the conference room, but may be applied to usage of any other room or device.

In the sixth embodiment, before the background target attribute is recognized, it is possible to determine whether the current date and time belongs to the usage time indicated by information specified from the two-dimensional bar code 603. In this case, if it is determined that the current date and time belongs to the usage time, the background target attribute may be recognized. Contrarily, if it is determined that the current date and time does not belong to the usage time, the background target attribute may not be recognized. Alternatively, for example, if it is determined that the current date and time does not belong to the usage time indicated by information specified from the two-dimensional bar code 603, the control command may not be generated.

Hereinbefore, preferred embodiments of the invention have been described, but these are illustrative, and thus, the scope of the present invention is not limited to the embodiments. The present invention is applicable in various forms. For example, the camera 107 may be provided integrally with the gesture sensor 108. That is, both the gesture and the background target attribute may be recognized by analyzing the photograph image of the camera 107.

The entire disclosure of Japanese Patent Application No. 2009-046678, filed Feb. 27, 2009 is expressly incorporated by reference herein.

What is claimed is:

1. A control system comprising:
    an input unit through which a signal for a gesture and a background of the gesture is input;
    a gesture recognition unit which recognizes the gesture on the basis of the input signal;
    an attribute recognition unit which recognizes an attribute of a background target of the recognized gesture on the basis of the input signal; and
    a command transmitting unit which generates a control command on the basis of a combination of the recognized gesture and the background target attribute and transmits the control command to a device;
    a storing unit which stores setting information indicating that a certain control is to be performed in the case that a certain gesture and a certain background target attribute are recognized; and
    an output control unit which outputs, in the case that a usage time of a specific room or a device which is provided in the room is designated, a usage restricted object which is an object for the usage time and a background target for controlling the device in the specific room, from an output device;
    wherein the input unit includes a gesture sensor which detects the gesture and a camera which photographs a background of the gesture;
    the input signal in the gesture recognition unit is a signal indicating the detected gesture;
    the input signal in the attribute recognition unit is a background image, which is photographed by the camera, of a gesture on an output device to which the usage restricted object and the background target are output;
    the attribute recognition unit analyzes the background image and recognizes the usage restricted object on the output device and the background target attribute of the gesture; and
    the command transmitting unit transmits the control command to the device which is provided in the specific room only in the case that the usage time indicated by the recognized usage restricted object is specified and current date and time belongs to the usage time, and the control command is a command for performing, for the device, a control specified from the setting information on the basis of the combination of the recognized gesture and the background target attribute.

2. The control system according to claim 1, wherein the command transmitting unit generates and transmits the command control for performing an output having the background target of the gesture in an output device.

3. The control system according to claim 1, further comprising a background target attribute notification unit which notifies a user of the gesture background target among objects which exist in a space in which the user exists.

4. The control system according to claim 3, wherein the background target attribute notification unit illuminates light to the gesture background target to notify the user of the gesture background target in the case that the user exists at a predetermined distance from the target, and stops the light illuminating to the gesture background target in the case that the user moves to a place removed from the target by a predetermined distance.

5. The control system according to claim 1, wherein the command transmitting unit specifies a schedule, and a process performed by the command transmitting unit is varied according to a relation between the specified schedule and the current date and time.

6. A control apparatus comprising: a gesture recognition unit which recognizes a gesture;
- an attribute recognition unit which recognizes an attribute of a background target of the recognized gesture; and
- a command transmitting unit which generates a control command on the basis of a combination of the recognized gesture and the background target attribute and transmits the control command to a device;
- a storing unit which stores setting information indicating that a certain control is to be performed in the case that a certain gesture and a certain background target attribute are recognized; and
- an output control unit which outputs, in the case that a usage time of a specific room or a device which is provided in the room is designated, a usage restricted object which is an object for the usage time and a background target for controlling the device in the specific room, from an output device;
- wherein the input unit includes a gesture sensor which detects the gesture and a camera which photographs a background of the gesture;
- the input signal in the gesture recognition unit is a signal indicating the detected gesture;
- the input signal in the attribute recognition unit is a background image, which is photographed by the camera, of a gesture on an output device to which the usage restricted object and the background target are output;
- the attribute recognition unit analyzes the background image and recognizes the usage restricted object on the output device and the background target attribute of the gesture; and
- the command transmitting unit transmits the control command to the device which is provided in the specific room only in the case that the usage time indicated by the recognized usage restricted object is specified and current date and time belongs to the usage time, and the control command is a command for performing, for the device, a control specified from the setting information on the basis of the combination of the recognized gesture and the background target attribute.

7. A non-transitory medium for storing a computer program performing the following steps comprising:
- recognizing a gesture; recognizing an attribute of a background target of the recognized gesture; and
- generating a control command on the basis of a combination of the recognized gesture and the background target attribute and transmitting the control command;
- storing a setting information indicating that a certain control is to be performed in the case that a certain gesture and a certain background target attribute are recognized; and
- outputting using an output control unit, in the case that a usage time of a specific room or a device which is provided in the room is designated, a usage restricted object which is an object for the usage time and a background target for controlling the device in the specific room, from an output device;
- detecting the gesture using an input unit includes a gesture sensor and detecting a background of the gesture using a camera;
- indicating detected gesture using an input signal in a gesture recognition unit;
- recognizing the input signal in the attribute recognition unit is a background image, which is photographed by the camera, of a gesture on an output device to which the usage restricted object and the background target are output;
- analyzing the background image and recognizing the usage restricted object on the output device and the background target attribute of the gesture; and
- transmitting the control command to the device which is provided in the specific room only in the case that the usage time indicated by the recognized usage restricted object is specified and current date and time belongs to the usage time, and performing using the control command, for the device, a control specified from the setting information on the basis of the combination of the recognized gesture and the background target attribute.

* * * * *